United States Patent
Roan

[19]

[11] Patent Number: 6,000,108
[45] Date of Patent: Dec. 14, 1999

[54] TOWING HOOK STRUCTURE

[76] Inventor: Jing-Wen Roan, 58, Ma Yuan West St., Taichung, Taiwan

[21] Appl. No.: 09/236,021

[22] Filed: Jan. 22, 1999

[51] Int. Cl.[6] .............................. A44B 13/00; F16B 45/00; F16G 11/00
[52] U.S. Cl. ...................... 24/600.9; 24/601.1; 24/601.2; 24/265 H
[58] Field of Search ................................ 24/600.9, 600.3, 24/599.9, 600.8, 601.1, 601.2, 265 CD

[56] References Cited

U.S. PATENT DOCUMENTS

| | | | |
|---|---|---|---|
| 509,747 | 11/1893 | Mauk | 24/600.9 |
| 0,652,885 | 7/1900 | Brown | 24/600.9 |
| 1,076,318 | 10/1913 | Reynolds | 24/601.1 |
| 2,787,435 | 4/1957 | Shields | 24/601.2 |
| 4,061,873 | 12/1977 | Berg, Jr. et al. | 24/601.1 |
| 4,380,101 | 4/1983 | Joubert et al. | 24/601.1 |
| 4,464,813 | 8/1984 | Bakker et al. | 24/601.2 |
| 4,622,724 | 11/1986 | Dupre | 24/601.2 |

FOREIGN PATENT DOCUMENTS 1369201  10/1974  United Kingdom ................. 24/601.2

*Primary Examiner*—Victor N. Sakran

[57] ABSTRACT

An improved towing hook structure including a hook body having a surface provided with reinforcing ribs. The exterior of the hook body is wrapped in a layer of tough and wear-resistant rubber or plastic material using hot pressing to reduce possible damage to or scratching of the surface of a car to be towed. A rubber or plastic stop element and a rubber of plastic projection are integrally formed in the process of hot pressing to extend respectively from both ends of an opening of the hook body. The stop element is pushed into the projection prior to being completely cured so that it can elastically press upon and be retained in the opening of the hook body.

1 Claim, 4 Drawing Sheets

TOWING HOOK STRUCTURE

BACKGROUND OF THE INVENTION (a) Field of the Invention

The present invention relates to an improved towing hook, more particularly to a towing hook structure that is wrapped in a layer of tough and durable rubber or plastic material, and that has a rubber or plastic projection and a rubber or plastic stop element extending integrally from an opening of the towing hook, the stop element being pushed into the projection prior to curing, whereby the stop element can be elastically retained at the opening of the towing hook.

(b) Description of the Prior Art

Conventional towing hooks are usually made of metal. FIG. 1 shows a conventional metal towing hook 10. In use, when the towing hook 10 is fastened to a fastening ring of a car to be towed, it will inevitably scrape or scratch the surface of the car. In addition, as shown in FIG. 1, a stop piece 14 is pivotally connected to the towing hook 10 at its opening 11 by using a rivet 12 and a torsion spring so as to utilize the resetting action of the torsion spring 13 to stop the stop piece 14 at the opening 11 to thereby prevent slippage of the towing hook 10 after it has been attached to the fastening ring of the car. Assembly of the stop piece 14 is inconvenient.

SUMMARY OF THE INVENTION

A primary object of the present invention is to provide an improved towing hook structure, in which a hook body has a surface provided with reinforcing ribs, and the exterior of the hook body is wrapped in a layer of tough and wear-resistant rubber of plastic material using hot pressing so as to effectively prevent possible damage to or scratching of the surface of a car to be towed.

Another object of the present invention is to provide an improved towing hook structure, in which a rubber or plastic stop element and a rubber of plastic projection are integrally formed during hot pressing of a layer of rubber of plastic material on the exterior of a hook body, the stop element being pushed into the projection prior to being completely cured so that it can elastically press upon and be retained in the opening of the hook body. The towing hook structure of the present invention reduces manufacturing costs and does not require use of rivets, torsion springs or stop pieces as in the prior art.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
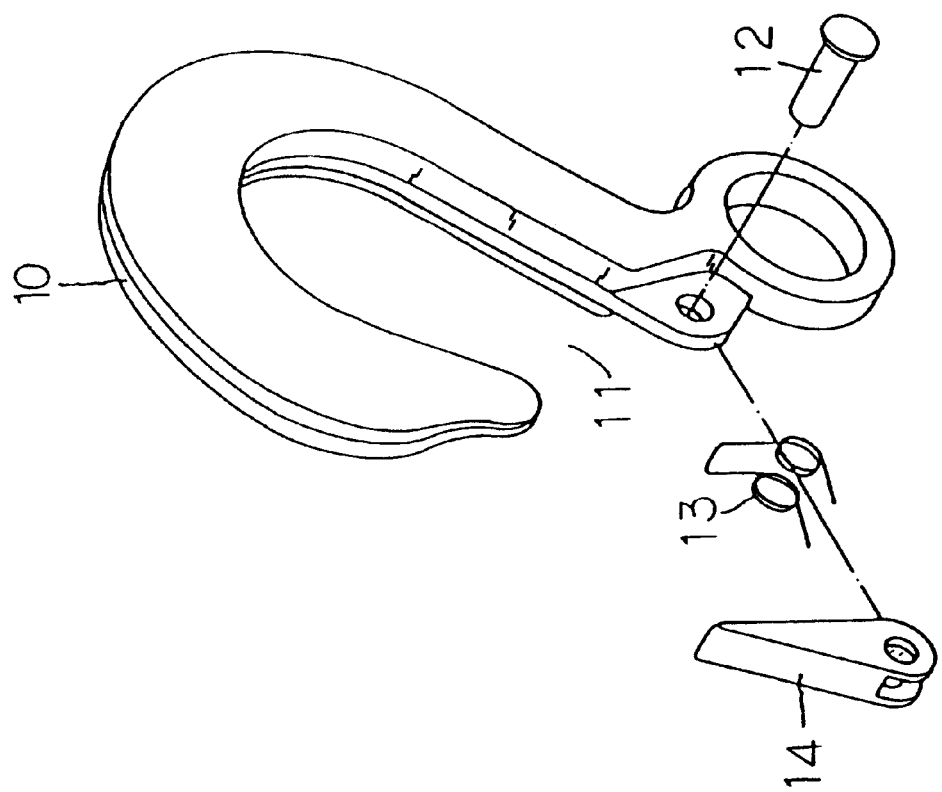
FIG. 1 is a perspective schematic view of a conventional towing hook of the prior art.
Figure 2:
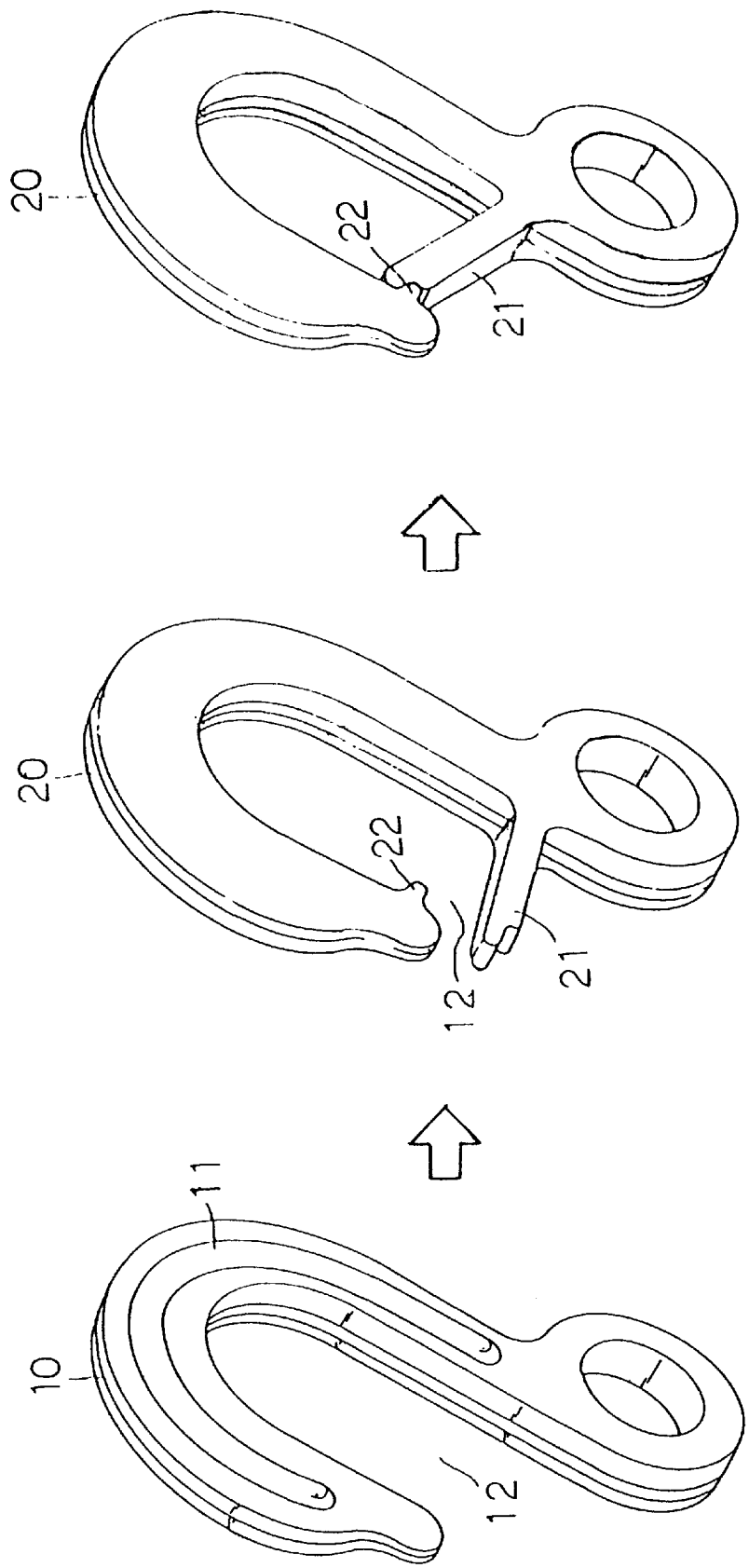
FIGS. 2A, 2B, and 2C are perspective schematic views of the present invention.
Figure 3:
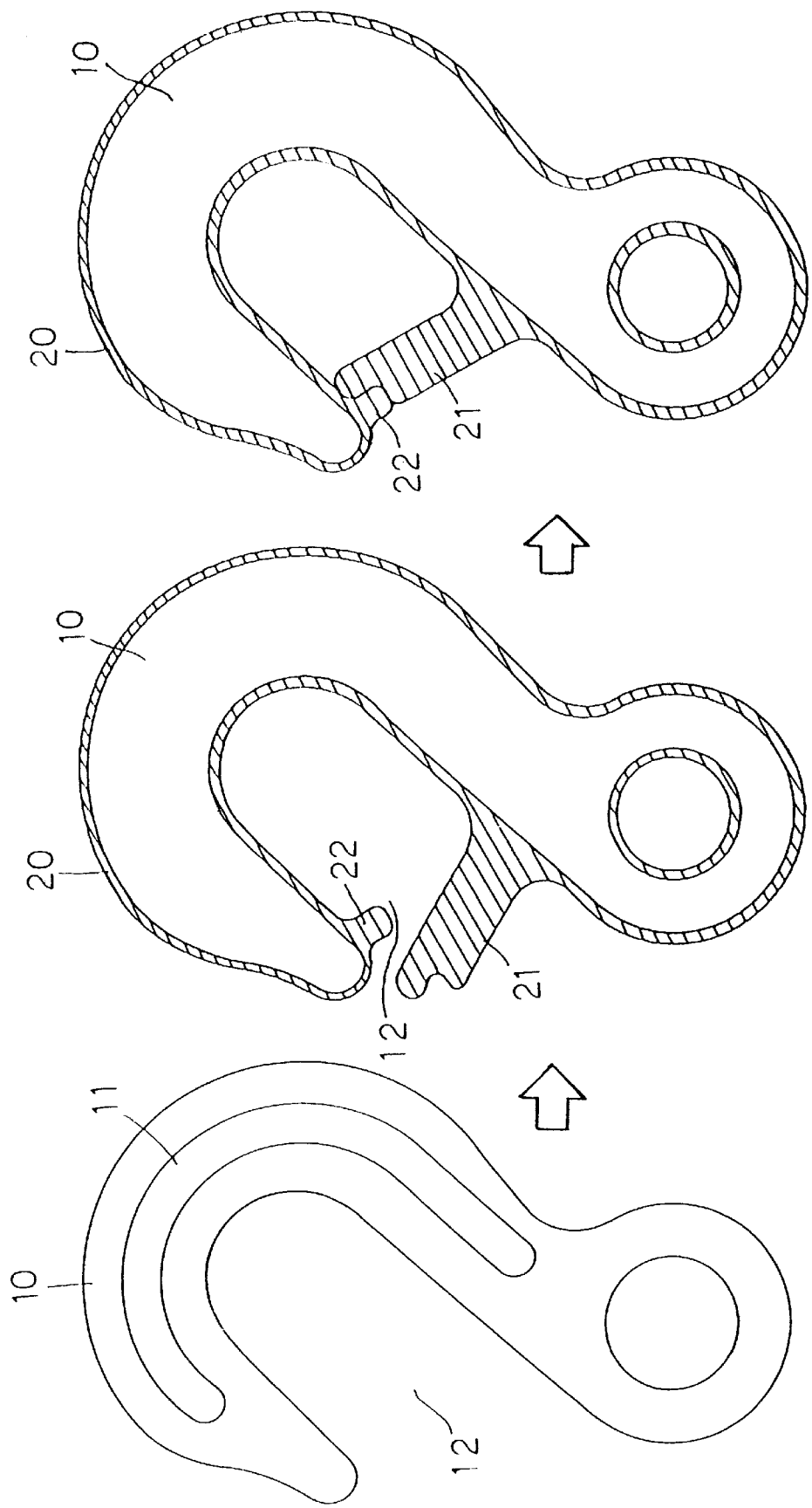
FIGS. 3A, 3B and 3C are plan schematic views illustrating the manufacturing process of the present invention.

With reference to FIGS. 2A, 2B, and 2C, a preferred embodiment of a towing hook 10 according to the present invention has a surface provided with reinforcing ribs 11 at suitable positions to enhance the structural, tensile, and torsional strength of the towing hook 10. In the process of making the towing hook 10, the exterior of the towing hook 10 is wrapped in a rubber or plastic layer 20 of preferred toughness and wear resistance using hot pressing sealing, whereby possible damage to or scratching of the car can be avoided. With reference to FIGS. 3A, 3B and 3C, in the process of hot pressing formation, a stop element 21 and a projection 22 are integrally formed at an opening 12 of the towing hook 10, the stop element 21 and the projection 22 being formed from rubber or plastic. Before the rubber or plastic stop element 21 is completely cured, it is pushed into the rubber or plastic projection 22 so that the stop element 21 can utilize its own resetting tension to be retained in the opening 12 of the towing hook 10.

Figure 4:
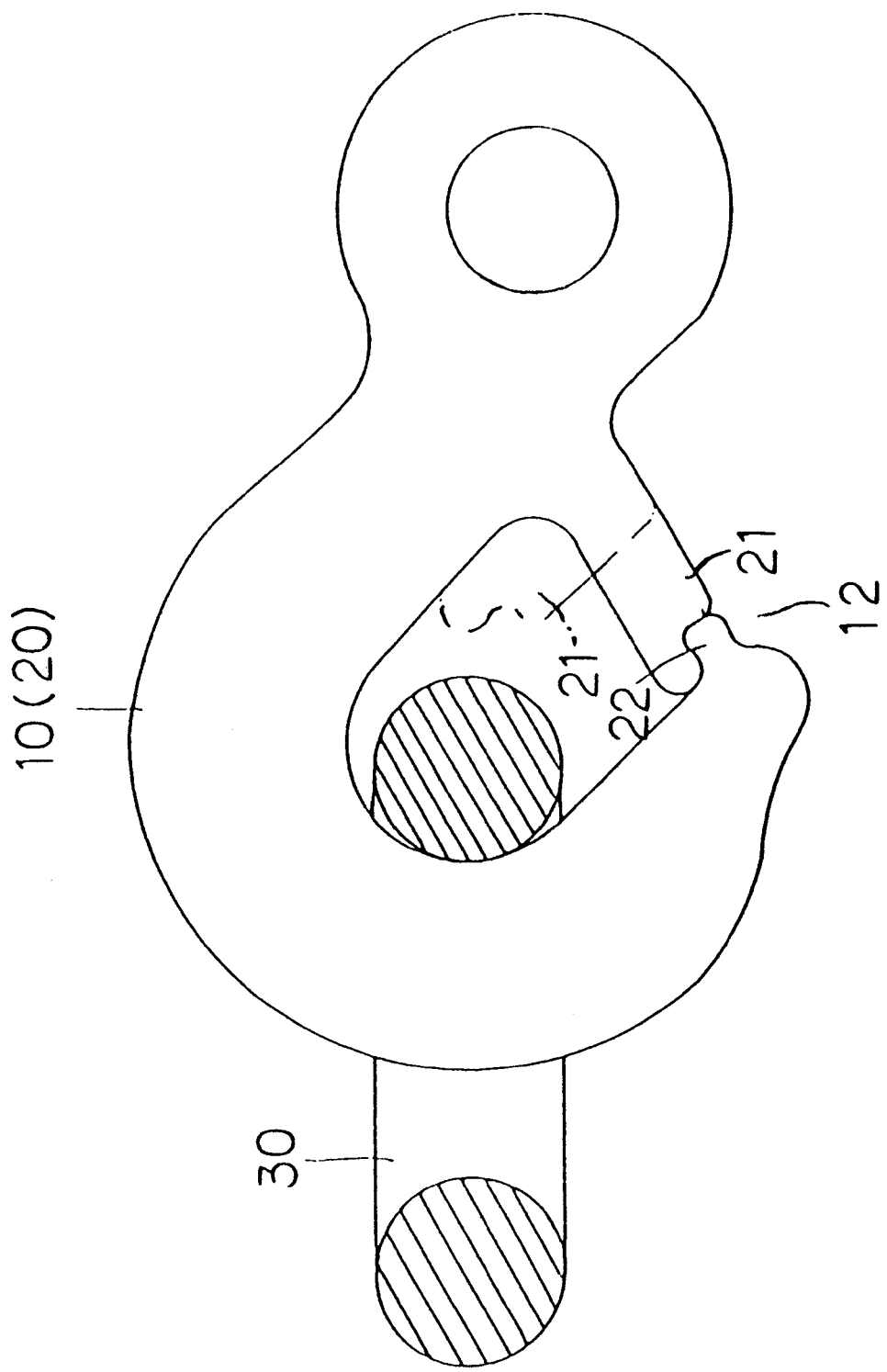
FIG. 4 is schematic view of the present invention in use.

With reference to FIG. 4, in use, as the towing hook 10 of the present invention is wrapped by a layer of rubber of plastic material 20, when the towing hook 10 is fastened to a fastening ring 30 of a car to be towed, it will not cause damage to or scratch the car. In addition, as the rubber or plastic stop element 21 and projection 22 extend integrally from the layer of rubber or plastic material 20 at the opening 12 of the towing hook 10, the stop element 21 can utilize its own elastic tension to be retained in the opening 12. Hence, when the towing hook 10 is fastened to the fastening ring 30 of the car, the stop element 21 will elastically press upon and be retained in the opening 12, without the need to provide such elements as a rivet 12, a torsion spring 13, a stop piece 14, etc., as in the prior. It can therefore be appreciated that the present invention is more practical and convenient to use than conventional towing hooks in terms of use or manufacturing process.

Although the present invention has been illustrated and described with reference to the preferred embodiment thereof, it should be understood that it is in no way limited to the details of such embodiment but is capable of numerous modifications within the scope of the appended claims.

What is claimed is:

1. An improved towing hook structure comprising:

a metal hook body, said metal hook body having a surface provided with reinforcing ribs, said metal hook body having an exterior wrapped in a layer of tough and wear-resistant rubber material, a rubber stop element and a rubber projection being integrally formed with said layer of tough and wear-resistant rubber material and extending respectively at both ends of an opening of said metal hook body, wherein said rubber stop element being pushed into said rubber projection prior to being completely cured so that said rubber stop element is elastically pressed upon and retained in said opening of said metal hook body.

* * * * *